United States Patent
Xiang et al.

(10) Patent No.: US 10,004,070 B2
(45) Date of Patent: Jun. 19, 2018

(54) METHOD AND SYSTEM FOR SHARING FREQUENCY SPECTRUM BETWEEN GSM SYSTEM AND LTE SYSTEM

(75) Inventors: Jiying Xiang, Shenzhen (CN); Guanghui Yu, Shenzhen (CN); Liujun Hu, Shenzhen (CN); Shijun Chen, Shenzhen (CN); Yanwei Wu, Shenzhen (CN); Zhaogang He, Shenzhen (CN); Xianming Zhao, Shenzhen (CN); Daxiong Xie, Shenzhen (CN)

(73) Assignee: ZTE CORPORATION, Shenzhen, Guangdong (CN)

(*) Notice: Subject to any disclaimer, the term of this patent is extended or adjusted under 35 U.S.C. 154(b) by 265 days.

(21) Appl. No.: 13/981,717

(22) PCT Filed: Sep. 20, 2011

(86) PCT No.: PCT/CN2011/079887
§ 371 (c)(1),
(2), (4) Date: Jul. 25, 2013

(87) PCT Pub. No.: WO2012/100548
PCT Pub. Date: Aug. 2, 2012

(65) Prior Publication Data
US 2013/0315183 A1  Nov. 28, 2013

(30) Foreign Application Priority Data
Jan. 28, 2011  (CN) .......................... 2011 1 0031601

(51) Int. Cl.
*H04W 72/04*  (2009.01)
*H04W 72/12*  (2009.01)
(Continued)

(52) U.S. Cl.
CPC ... *H04W 72/0453* (2013.01); *H04W 72/1215* (2013.01); *H04L 5/0044* (2013.01);
(Continued)

(58) Field of Classification Search
CPC ... H04L 5/0044; H04L 5/0053; H04L 5/0073; H04W 16/14; H04W 72/0453; H04W 72/1215
(Continued)

(56) References Cited

U.S. PATENT DOCUMENTS 8,660,570 B2 *  2/2014  Han ...................... H04W 24/02
370/331
2010/0136989 A1  6/2010  Westerberg
(Continued)

FOREIGN PATENT DOCUMENTS

CN  101578898 A  11/2009
CN  101635928 A  1/2010
(Continued)

OTHER PUBLICATIONS

3GPP, "LTE; Evolved Universal Terrestrial Radio Access (E-UTRA); Physical channels and modulation", Jan. 2010, ETSI, 3GPP TS 36.211 version 8.9.0 Release 8, pp. 57-61.*
(Continued)

*Primary Examiner* — Un C Cho
*Assistant Examiner* — Shah Rahman
(74) *Attorney, Agent, or Firm* — Oppedahl Patent Law Firm LLC

(57) ABSTRACT

The disclosure discloses a method for sharing a frequency spectrum between a GSM system and a LTE system. The method includes: avoiding fixed channels of the LTE system of a current cell when allocating frequency points of the GSM system to the current cell and a neighbor cell interfering with the current cell; frequency domain resources allocated to users and indicated by Physical Downlink Share Channels (PDSCHs) and Physical Uplink Share Channels (PUSCHs) of the LTE system are not located on same frequency resources with frequency points of the GSM
(Continued)

system of the current cell and the neighbor cell interfering with the current cell.

11 Claims, 3 Drawing Sheets

(51) Int. Cl.
  *H04W 16/02* (2009.01)
  *H04L 5/00* (2006.01)
  *H04W 16/14* (2009.01)
(52) U.S. Cl.
  CPC .......... *H04L 5/0053* (2013.01); *H04L 5/0073* (2013.01); *H04W 16/02* (2013.01); *H04W 16/14* (2013.01)
(58) Field of Classification Search
  USPC ......................................... 370/329, 436, 437
  See application file for complete search history.

(56) References Cited

U.S. PATENT DOCUMENTS

| | | | |
|---|---|---|---|
| 2010/0222065 A1* | 9/2010 | De Pasquale | H04W 16/14 455/450 |
| 2010/0248739 A1 | 9/2010 | Westerberg | |
| 2010/0311407 A1* | 12/2010 | Yao | H04W 36/0083 455/422.1 |
| 2010/0322227 A1* | 12/2010 | Luo | H04B 7/024 370/345 |
| 2011/0053601 A1* | 3/2011 | Frederiksen | H04J 11/0093 455/447 |
| 2011/0077015 A1 | 3/2011 | Saily | |
| 2011/0077030 A1* | 3/2011 | Wigren | G01S 5/0252 455/456.5 |
| 2011/0086652 A1* | 4/2011 | So | H04W 24/02 455/501 |
| 2011/0170496 A1* | 7/2011 | Fong | H04L 5/0053 370/329 |
| 2011/0222479 A1 | 9/2011 | Cyranka | |
| 2012/0039268 A1* | 2/2012 | Hakkinen | H04L 5/001 370/329 |
| 2013/0079009 A1* | 3/2013 | Aumann | H04W 16/02 455/436 |
| 2013/0242932 A1* | 9/2013 | Tiirola | H04W 16/14 370/329 |
| 2013/0273928 A1 | 10/2013 | Westerberg | |
| 2013/0294415 A1* | 11/2013 | Moilanen | H04W 16/14 370/331 |

FOREIGN PATENT DOCUMENTS

| | | | | |
|---|---|---|---|---|
| CN | 101720096 A | 6/2010 | | |
| CN | 102118758 A | 7/2011 | | |
| JP | 2011512267 A | 4/2011 | | |
| WO | 2005065198 A2 | 7/2005 | | |
| WO | 2008081309 A2 | 7/2008 | | |
| WO | 2008088253 A1 | 7/2008 | | |
| WO | 2008088254 A1 | 7/2008 | | |
| WO | WO 2009050212 A1 * | 4/2009 | ............ | H04W 16/14 |
| WO | 2010029177 A2 | 3/2010 | | |
| WO | 2010091713 A1 | 8/2010 | | |
| WO | WO 2011023073 A1 * | 3/2011 | ............ | H04W 16/14 |

OTHER PUBLICATIONS

Supplementary European Search Report in European application No. 11856947.4, dated Dec. 12, 2014.
International Search Report in international application No. PCT/CN2011/079887, dated Dec. 22, 2011.
English Translation of the Written Opinion of the International Search Authority in international application No. PCT/CN2011/079887, dated Dec. 22, 2011.

* cited by examiner

METHOD AND SYSTEM FOR SHARING FREQUENCY SPECTRUM BETWEEN GSM SYSTEM AND LTE SYSTEM

TECHNICAL FIELD

The disclosure relates to a frequency spectrum sharing technology, and in particular to a method and a system for sharing a frequency spectrum between a Global System for Mobile Communications (GSM) system and a Long Time Evolution (LTE) system.

BACKGROUND

The GSM system is a narrow-band communication system, a bandwidth of which is about 200 kHz. When GSM systems are used to form a cellular network, different frequency points can be used between possibly interfering neighbour cells, so as to avoid co-channel interference. A specific application is that several continuous frequency points (for example, these continuous frequency points occupy a bandwidth of 10 MHz) can be used during GSM networking, however, each cell only uses one or a few frequency points and frequency points used by a current cell and frequency points used by neighbour cells possibly interfering with the current cell are different, so that the co-channel interference is reduced. The LTE system is a wideband communication system, the bandwidth of which is configurable, and the bandwidth of one carrier can range from 1.4 MHz to 20 MHz.

It can be seen from the above description that each cell of the GSM system only occupies one or a few frequency points and the bandwidth used by each cell is very low compared to the total bandwidth (for example, if one cell only deploys one GSM frequency point and the available total bandwidth is 10 MHz, then the frequency spectrum utilization is only 0.2%).

Additionally, how to transit from frequency spectrums occupied by the GSM system to the LTE system smoothly also needs to be considered. An existing solution is to deploy vacated continuous frequency spectrum to the LTE system after the considerable continuous frequency spectrums are vacated due to the decrease of the number of users of the GSM. However, such approach has disadvantages of low frequency spectrum utilization and poor smoothness.

Therefore, how to enable the GSM system and the LTE system to share the same frequency spectrum and how to enable the GSM system to transit to the LTE system smoothly while improving frequency spectrum utilization become present concerns.

SUMMARY

The purpose of the disclosure is to provide a method and a system for sharing a frequency spectrum between a GSM system and an LTE system, so as to enable the GSM system to transit to the LTE system smoothly while improving frequency spectrum utilization.

In order to overcome the above problems, the disclosure provides a method for sharing a frequency spectrum between a GSM system and an LTE system, which includes:

for fixed channels of the LTE system, avoiding the fixed channels of the LTE system of a current cell when allocating frequency points of the GSM system to the current cell and a neighbour cell interfering with the current cell;

for frequency domain resources allocated to users and indicated by Physical Downlink Share Channels (PDSCHs) and Physical Uplink Share Channels (PUSCHs) of the LTE system, allocating frequency points of the GSM system to the current cell and the neighbour cell interfering with the current cell, wherein the frequency points of the GSM system are not located on same frequency resources with frequency locations of the frequency domain resources allocated to the users;

for Physical Control Format Indicator Channels (PCFICHs) and Physical Hybrid ARQ Indicator Channels (PHICHs) of the LTE system, allocating frequency points of the GSM system to the current cell and the neighbour cell interfering with the current cell by avoiding the PCFICHs and the PHICHs of the LTE system; or allocating, by the LTE system, an appropriate Cell Identification (CellID) to avoid the frequency points of the GSM system of the current cell and the neighbour cell interfering with the current cell; and taking no resource avoiding measure for Physical Downlink Control Channels (PDCCHs) of the LTE system; or the LTE system increases PDCCH resources to make up or the LTE system schedules appropriate PDCCH resources to avoid interference.

Preferably, the fixed channels of the LTE system may include at least one of the following channels: Physical Broadcast Channels (PBCHs), Primary Synchronization Channels (PSCHs)/Secondary Synchronization Channels (SSCHs), Physical Downlink Share Channels (PDSCHs) at which Main Information Blocks (MIBs) are located, Physical Uplink Control Channels (PUCCHs) and Physical Random Access Channels (PRACHs).

Preferably, for the fixed channels of the LTE system, the GSM system may avoid the fixed channels of the LTE system by taking one or more Resource Blocks (RBs) of the LTE system as unit.

Preferably, for the fixed channels of the LTE system, the GSM system may allocate GSM frequency points to the current cell and the neighbour cell interfering with the current cell by avoiding frequency domain locations of the fixed channels of the LTE system.

Preferably, for the PDSCHs and the PUSCHs of the LTE system, the GSM system may be avoided by taking one or more RBs of the LTE system as unit.

Preferably, for the PCFICHs and the PHICHs of the LTE system, the LTE system may avoid the GSM by taking one or more Resource Element Groups (REGs) of the LTE system as unit, or the GSM may avoid the LTE system by taking one or more REGs of the LTE system as unit.

Preferably, when the GSM performs frequency hopping, the GSM may notify the LTE system of frequency hopping modes of the current cell and the neighbour cell interfering with the current cell to avoid interfering with the LTE system.

Preferably, appropriate guard bands may be kept when avoiding interference.

The disclosure further provides a system for sharing a frequency spectrum, which includes a GSM system and an LTE system, wherein the system for sharing a frequency spectrum further includes a coordinating device configured to:

allocate frequency points of the GSM system to a current cell and a neighbour cell interfering with the current cell, wherein the frequency points of the GSM system and the fixed channels of the LTE system are not located on the same frequency resources to avoid interfering with fixed channels of the LTE system;

allocate frequency points of the GSM system to the current cell and the neighbour cell interfering with the current cell, wherein the frequency points of the GSM system are not located on same frequency resources with frequency domain resources allocated to users of the LTE system and indicated by Physical Downlink Share Channels (PDSCHs) and Physical Uplink Share Channels (PUSCHs) of the LTE system so as to avoid interfering with the users of the LTE system;

allocate frequency points of the GSM system to the current cell and the neighbour cell interfering with the current cell, wherein the frequency points of the GSM system are not located on same frequency resources with Physical Control Format Indicator Channels (PCFICHs) and Physical Hybrid ARQ Indicator Channels (PHICHs) of the LTE system so as to avoid interfering with the PCFICHs and the PHICHs of the LTE system; and take no resource avoiding measure on PDCCHs of the LTE system; or, for the LTE system, increase allocated Physical Downlink Control Channels (PDCCHs) resources to make up or schedule appropriate PDCCH resources to avoid interference.

Compared with the prior art, the GSM system and the LTE system can share the same frequency spectrum according to the method and system of the disclosure. The interference between the GSM system and the LTE system can be fully controlled, and even disappeared. Furthermore, when users of the GSM system in a network are decreased gradually, frequency points occupied by the GSM system are reduced correspondingly, and restriction of the GSM to the LTE system are thus reduced gradually, so that smooth transition from the GSM to the LTE system can be realized.

BRIEF DESCRIPTION OF THE DRAWINGS

The drawings illustrated here provide further understanding of the disclosure and form a part of the disclosure. An exemplary embodiment of the disclosure and explanation thereof are used to explain the disclosure instead of constituting an improper limit of the disclosure. In the drawings.

DETAILED DESCRIPTION

Figure 1:
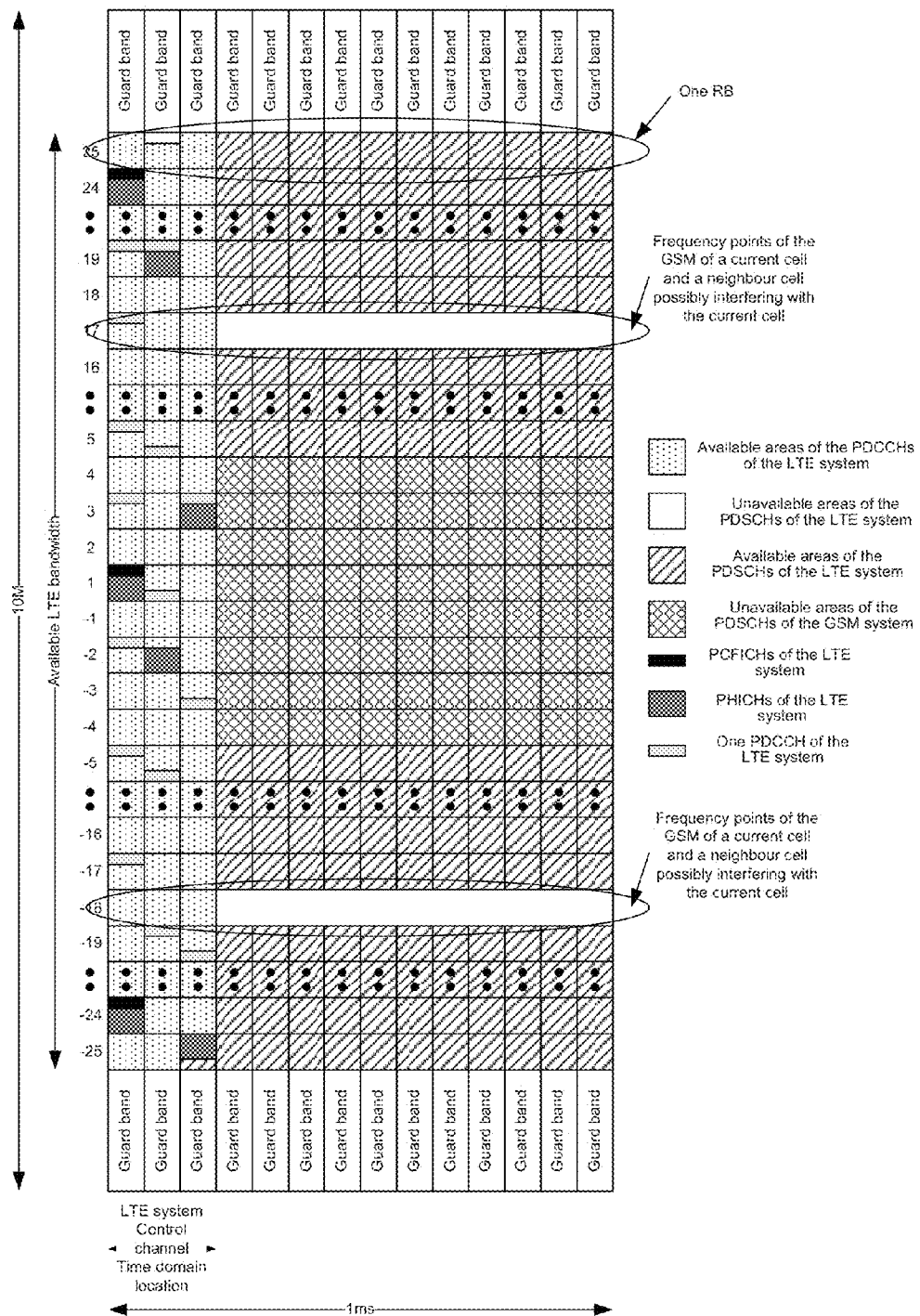
FIG. 1 shows a schematic diagram of a downlink sharing frequency spectrum between a GSM system and an LTE according to an embodiment of the disclosure.

In order to make the technical problem to be solved, solution and beneficial effects of the disclosure more clear and understood, the disclosure is be further illustrated in combination with the drawings and embodiments below. It should be understood that the specific embodiments described here are merely used to explain the disclosure instead of limiting the disclosure.

In order to realize that the GSM system and the LTE system share the same frequency spectrum, the technical solution of the disclosure is as follows.

Since power spectrum density of signals of the GSM system (for example, transmitting a power of 20 W on a frequency point of 200 kHz) is much greater than power spectrum density of signals of the LTE system (for example, transmitting a power of 20 W on a bandwidth of 10 MHz), interference of the LTE system to the GSM system can be ignored, whereas interference of the GSM system to the LTE system is very strong. In order to reduce this interference, the disclosure performs different processing on different channels. The specific processing methods are as follows:

(1) For Fixed channels of the LTE system, such as PBCHs, PSCHs/SSCHs, PDSCHs at which MIBs are located, PUCCHs, and PRACHs, which are not disturbed by the GSM system, it can be realized by avoiding the fixed channels when frequency points of the GSM system are allocated to a current cell and a neighbour cell possibly interfering with the current cell.

Preferably, the GSM system may avoid the fixed channels of the LTE system by taking one or more RBs of the LTE system as unit.

Preferably, the GSM system may never allocate the GSM frequency points to the current cell and the neighbour cell possibly interfering with the current cell on frequency domain locations at which the fixed channels of the LTE system are located;

(2) For locations of frequency domain resources allocated to users and indicated by the PDSCHs and PUSCHs of the LTE system, the LTE system schedules according to frequency points occupied by the GSM system of the current cell and the neighbour cell possibly interfering with the current cell, so that the frequency domain resources, which are allocated to users and indicated by the PDSCHs and PUSCHs of the LTE system, are not on the same frequency with the frequency points of the GSM system of the current cell and the neighbour cell possibly interfering with the current cell, thereby avoiding interference;

Preferably, the PDSCHs and PUSCHs of the LTE system may avoid the GSM system by taking one or more RBs of the LTE system as unit.

(3) PCFICHs and PHICHs of the LTE system

The GSM system may allocate frequency points of the GSM system for the current cell and the neighbour cell possibly interfering with the current cell to avoid the PCFICHs and PHICHs of the LTE system. Preferably, the GSM system may avoid the PCFICHs and PHICHs of the LTE system by taking one or more REGs of the LTE system as unit or by taking one or more RBs as unit.

Alternatively, the LTE system may allocate an appropriate Cell Identification (CellID) to avoid the frequency points of the GSM system of the current cell and the neighbour cell possibly interfering with the current cell, thereby avoiding interference. Preferably, the PCFICHs and PHICHs of the LTE system may perform avoiding by taking one or more REGs of the LTE system as unit or by taking one or more RBs as unit when avoiding the GSM system;

(4) PDCCHs of the LTE system

No resource avoiding measure may be taken. Although there is interference of the GSM system, it is considered that resources occupied by each PDCCH of the LTE system are variable and only a small part of these resources are interfered by the GSM system, and therefore, a receiver is still able to parse this PDCCH correctly as long as enough resources are allocated.

Alternatively, the LTE system may determine, according to frequency resources occupied by the PDCCHs, whether the frequency resources occupied by the PDCCHs are overlapped with frequency resources occupied by the GSM system of the current cell and the neighbour cell possibly interfering with the current cell, and determine, according to how many frequency resources are overlapped, whether to select another PDCCH or schedule this user. For example, resources allocated to the PDCCH can be increased to make up, or appropriate PDCCH resources can be scheduled to avoid interference.

(5) Appropriate guard bands may be kept when avoiding interference.

Further, the above methods may also apply when the GSM performs frequency hopping, during which the GSM system only needs to notify the LTE system of the current cell of frequency hopping modes of the current cell and the neighbour cell possibly interfering with the current cell.

Further, the above methods may also apply to any Component Carrier (CC) of a Long Term Evolution-Advanced (LTE-A) system.

In order to make the disclosure be understood deeply, specific embodiments of the present disclosure related to sharing a frequency spectrum by the GSM system and the LTE system are given in combination with FIG. 1 and FIG. 2 below.

Figure 2:
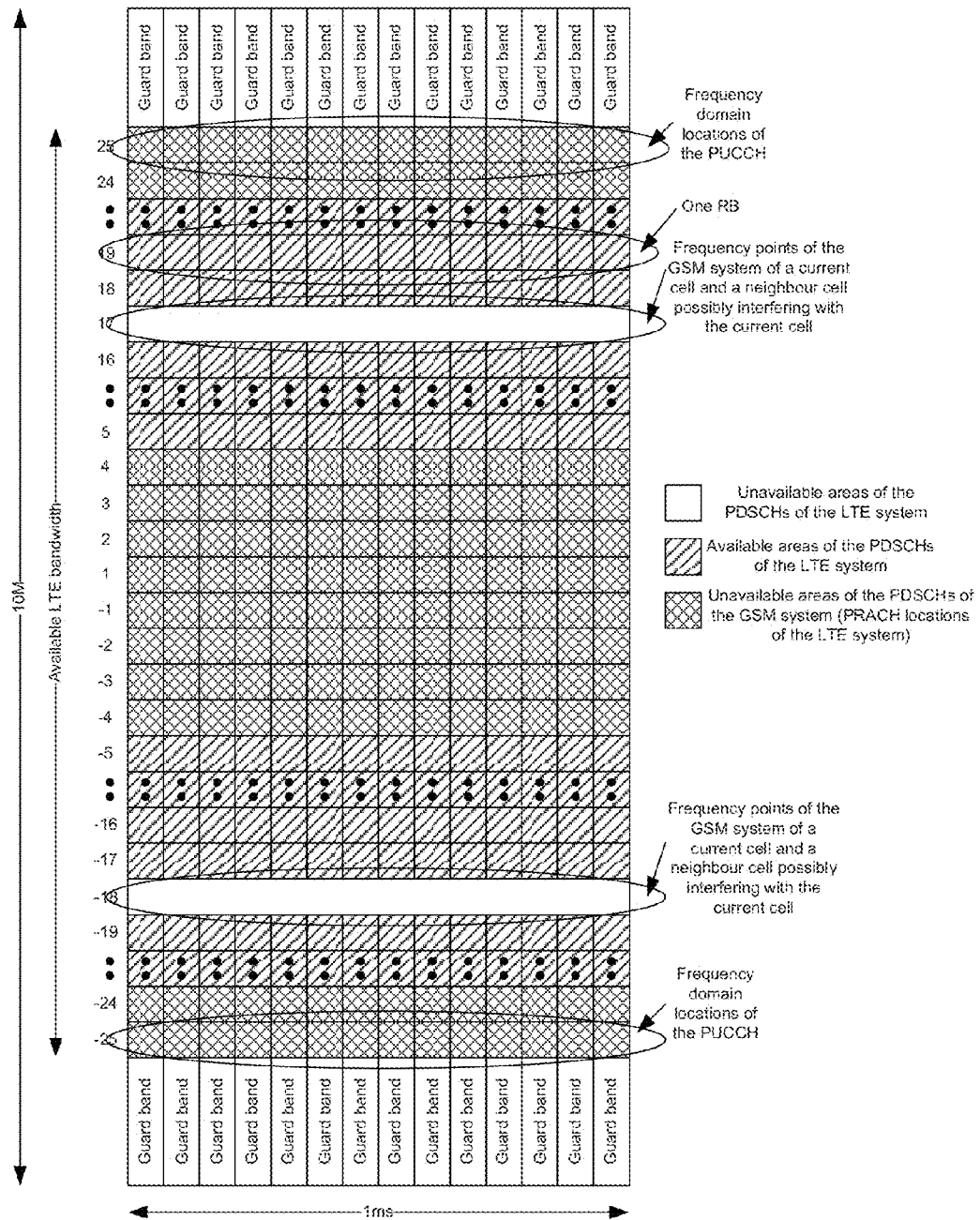
FIG. 2 shows a schematic diagram of an uplink sharing frequency spectrum between the GSM system and the LTE according to an embodiment of the disclosure.

As shown in FIG. 1 and FIG. 2, assuming that the bandwidth of the frequency spectrum shared by the GSM system and the LTE system is 10 MHz and the baseband is between −5 MHz to 5 MHz. According to parameters of the LTE system, there are 50 RBs, which are numbered as −25, −24, . . . , −1, 1, 2, . . . , and 25 respectively.

According to the disclosure, the GSM frequency points of the current cell and the neighbour cell possibly interfering with the current cell cannot be arranged on the fixed channels of the LTE system, such as PBCHs, PSCHs/SSCHs, PDSCHs at which MIBs are located, PUCCHs and PRACHs. Locations of these channels (except for the PUCCHs) are fixed on six RBs in the middle of the frequency domain, i.e., RBs numbered as −3, −2, −1, 1, 2, 3 (the locations of the PUCCHs are located at both sides of the bandwidth of the LTE system, and in this embodiment, the locations of the PUCCHs are located on RBs numbered as −25 and 25). Therefore, the frequency points of the GSM system of the current cell and the neighbour cell possibly interfering with the current cell cannot be arranged on such 8 RBs. With the purpose of further protection, several RBs can be kept as the guard bands, such as RBs numbered as −4, 4, −24 and 24, and thus the GSM frequency points cannot be arranged on 12 RBs in all, as shown in FIG. 1 and FIG. 2.

The locations of the frequency domain resources allocated to users and indicated by the PDSCHs and PUSCHs of the LTE system should avoid the GSM frequency points of the current cell and the neighbour cell possibly interfering with the current cell, as shown in FIG. 1 and FIG. 2.

The PCFICHs and PHICHs of the LTE system can avoid the GSM frequency points of the current cell and the neighbour cell possibly interfering with the current cell by allocating an appropriate CellID, as shown in FIG. 1.

The PDCCHs of the LTE system and the GSM frequency points of the current cell and the neighbour cell possibly interfering with the current cell may collide to cause interference, as shown in FIG. 1. However, the disturbed power is not very great, resources allocated to the PDCCHs can be increased to make up, or appropriate PDCCH resources can be scheduled to avoid interference.

Figure 3:
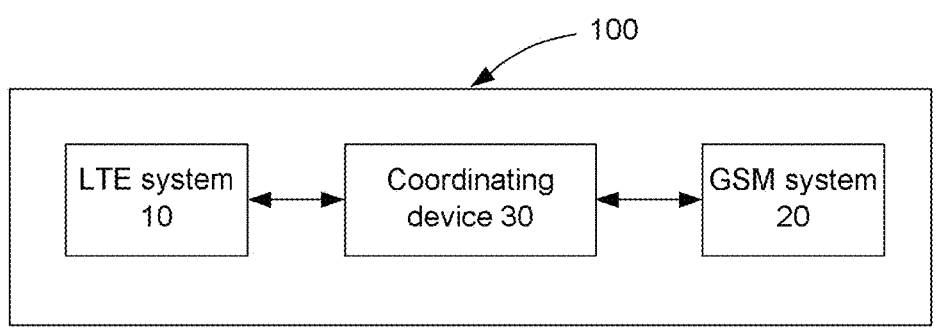
FIG. 3 shows a structural diagram of a system for sharing a frequency spectrum according to an embodiment of the disclosure.

FIG. 3 is a structural diagram of a system for sharing a frequency spectrum according to the disclosure. The system for sharing a frequency spectrum 100 includes an LTE system 10, a GSM system 20 and a coordinating device 30.

The coordinating device 30 is configured to:

allocate frequency points of the GSM system 20 to a current cell and a neighbour cell possibly interfering with the current cell, wherein the frequency points of the GSM system 20 and the fixed channels of the LTE system 10 are not located on the same frequency resources to avoid interfering with fixed channels of the LTE system 10;

allocate frequency points of the GSM system 20 to the current cell and the neighbour cell possibly interfering with the current cell, wherein the frequency domain resources and the frequency points of the GSM system 20 are not located on the same frequency resources with frequency domain resources allocated to the users of the LTE system 10 and indicated by PDSCHs and PUSCHs of the LTE system 10 to avoid interfering with the users of the LTE system 10;

allocate frequency points of the GSM system 20 to the current cell and the neighbour cell possibly interfering with the current cell, wherein the frequency points of the GSM system 20 are not located on the same frequency resources with PCFICHs and PHICHs of the LTE system 10 to avoid interfering with the PCFICHs and the PHICHs of the LTE system 10; and take no resource avoiding measure on PDCCHs of the LTE system 10; or, for the LTE system 10, increase allocated PDCCH resources of the LET system to make up, or schedule appropriate PDCCH resources to avoid interference.

The above description shows and describes one preferable embodiment of the disclosure. As previously mentioned, it should be understood that the disclosure is not confined to the description disclosed herein and should not be considered as exclusion of other embodiments, the disclosure can be applied to all other combinations, amendments and environments and can be modified according to the above teaching or technologies or knowledge of related fields within the conception of the disclosure. Any modifications or variations made by those skilled in the art within the spirit and principle of the disclosure shall fall within the scope of protection of the disclosure.

The invention claimed is:

1. A method for sharing the whole available Long Time Evolution (LTE) spectrum bandwidth between a Global System for Mobile Communications (GSM) system and a LTE system, the method comprising:

for fixed channels of the LTE system, allocating carrier frequencies of the GSM system to a current cell and a neighbour cell interfering with the current cell, wherein the carrier frequencies of the GSM system and the fixed channels of the LTE system are not located on same frequency resources to avoid interfering with the fixed channels of the LTE system:

for frequency domain resources allocated to users and indicated by Physical Downlink Share Channels (PDSCHs) and Physical Uplink Share Channels (PUSCHs) of the LTE system, allocating frequency domain resources of the LTE system to users which are not on same frequency resources with frequency locations of the carrier frequencies of the GSM system allocated to the current cell and the neighbour cell interfering with the current cell, so as to avoid interfering with the users of the LTE system;

for Physical Control Format Indicator Channels (PCFICHs) and Physical Hybrid ARQ Indicator Channels (PHICHs) of the LTE system, allocating carrier frequencies of the GSM system to the current cell and the neighbour cell interfering with the current cell, wherein the carrier frequencies of the GSM system are not located on same frequency resources with the PCFICFIs and PHICHs of the LTE system so as to avoid interfering with the PCFICHs and the PHICHs of the LTE system;

for Physical Downlink Control Channels (PDCCHs) of the LTE system, determining whether frequency resources occupied by the PDCCHs are overlapped with frequency resources occupied by the GSM system of the current cell and the neighbour cell interfering with the current cell, and, according to how many frequency resources are overlapped, increasing, by the LTE system, PDCCH resources to make up the PDCCH which has been interfered; and keeping appropriate guard bands when avoiding interference, wherein the carrier frequencies of the GSM system are allocated frequency resources within any location of the whole available LTE bandwidth.

2. The method according to claim 1, wherein for the fixed channels of the LTE system, avoiding, by the GSM system, the fixed channels of the LTE system by taking one or more Resource Blocks (RBs) of the LTE system as unit.

3. The method according to claim 1, wherein for the PDSCHs and the PUSCHs of the LTE system, avoiding the GSM system by taking one or more RBs of the LTE system as unit.

4. The method according to claim 1, wherein for the PCFICHs and the PHICHs of the LTE system, avoiding, by the LTE system, the GSM system by taking one or more Resource Element Groups (REGs) of the LTE system as unit, or avoiding, by the GSM system, the LTE system by taking one or more REGs of the LTE system as unit.

5. The method according to claim 1, wherein the fixed channels of the LTE system comprises at least one of the following channels: Physical Broadcast Channels (PBCHs), Primary Synchronization Channels (PSCHs)/Secondary Synchronization Channels (SSCHs), Physical Downlink Share Channels (PDSCHs) at which Main Information Blocks (MIBs) are located, Physical Uplink Control Channels (PUCCHs), and Physical Random Access Channels (PRACHs).

6. A system for sharing the whole available Long Time Evolution (LTE) LTE spectrum bandwidth, same frequency spectrum, comprising a Global System for Mobile Communications (GSM) system, a LTE system, and a coordinating device, implemented by a processor on which instructions stored in a memory are being executed, configured to:

for fixed channels of the LTE system, allocate carrier frequencies of the GSM system to a current cell and a neighbour cell interfering with the current cell, wherein the carrier frequencies of the GSM system and the fixed channels of the LTE system are not located on same frequency resources to avoid interfering with fixed channels of the LTE system;

for frequency domain resources allocated to users and indicated by Physical Downlink Share Channels (PDSCHs) and Physical Uplink Share Channels (PUSCHs) of the LTE system, allocate frequency domain resources of the LTE system to users which are not on same frequency resources with frequency locations of the carrier frequencies of the GSM system allocated to the current cell and the neighbour cell interfering with the current cell so as to avoid interfering with the users of the LTE system;

for Physical Control Format Indicator Channels (PCFICHs) and Physical Hybrid ARQ Indicator Channels (PHICHs) of the LTE system, allocate carrier frequencies of the GSM system to the current cell and the neighbour cell interfering with the current cell, wherein the carrier frequencies of the GSM system are not located on same frequency resources with PCFICHs and PHICHs of the LTE system so as to avoid interfering with the PCFICHs and the PHICHs of the LTE system;

for Physical Downlink Control Channels (PDCCHs) of the LTE system, determine whether frequency resources occupied by the PDCCHs are overlapped with frequency resources occupied by the GSM system of the current cell and the neighbour cell interfering with the current cell, and, according to how many frequency resources are overlapped, increase PDCCH resources of the LTE system to make up the PDCCH which has been interfered; and keep appropriate guard bands when avoiding interference, wherein the carrier frequencies of the GSM system are allocated frequency resources within any location of the whole available LTE bandwidth.

7. The method according to claim 2, wherein the fixed channels of the LTE system comprises at least one of the following channels: Physical Broadcast Channels (PBCHs), Primary Synchronization Channels (PSCHs)/Secondary Synchronization Channels (SSCHs), Physical Downlink Share Channels (PDSCHs) at which Main Information Blocks (MIBs) are located, Physical Uplink Control Channels (PUCCHs), and Physical Random Access Channels (PRACHs).

8. The method according to claim 3, wherein the fixed channels of the LTE system comprises at least one of the following channels: Physical Broadcast Channels (PBCHs), Primary Synchronization Channels (PSCHs)/Secondary Synchronization Channels (SSCHs), Physical Downlink Share Channels (PDSCHs) at which Main Information Blocks (MIBs) are located, Physical Uplink Control Channels (PUCCHs), and Physical Random Access Channels (PRACHs).

9. The method according to claim 4, wherein the fixed channels of the LTE system comprises at least one of the following channels: Physical Broadcast Channels (PBCHs), Primary Synchronization Channels (PSCHs)/Secondary Synchronization Channels (SSCHs), Physical Downlink Share Channels (PDSCHs) at which Main Information Blocks (MIBs) are located, Physical Uplink Control Channels (PUCCHs), and Physical Random Access Channels (PRACHs).

10. The method according to claim 1, further comprising: when the GSM system performs frequency hopping, notifying, by the GSM system, the LTE system of frequency hopping modes of the current cell and the neighbour cell interfering with the current cell to avoid interfering with the LTE system.

11. The system according to claim 6, wherein when the GSM system performs frequency hopping, the GSM system notifies the LTE system of frequency hopping modes of the current cell and the neighbour cell interfering with the current cell to avoid interfering with the LTE system.

* * * * *